(12) United States Patent
Lee et al.

(10) Patent No.: US 11,498,842 B2
(45) Date of Patent: Nov. 15, 2022

(54) METHOD OF FORMING NANOPARTICLES HAVING SUPERHYDROPHOBICITY

(71) Applicant: INDUSTRY FOUNDATION OF CHONNAM NATIONAL UNIVERSITY, Gwangju (KR)

(72) Inventors: Dong Weon Lee, Gwangju (KR); Chae Rin Yu, Gwangju (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 433 days.

(21) Appl. No.: 16/691,766

(22) Filed: Nov. 22, 2019

(65) Prior Publication Data
US 2020/0346936 A1 Nov. 5, 2020

(30) Foreign Application Priority Data
May 2, 2019 (KR) .................. 10-2019-0051299

(51) Int. Cl.
C01B 33/18 (2006.01)
C01B 32/15 (2017.01)
C01B 32/18 (2017.01)
B29C 71/02 (2006.01)
B82B 3/00 (2006.01)
(Continued)

(52) U.S. Cl.
CPC .......... C01B 33/183 (2013.01); B82B 3/0095 (2013.01); C01B 32/15 (2017.08); C01B 32/18 (2017.08); C08J 7/06 (2013.01); C08J 7/08 (2013.01); C08K 3/04 (2013.01); C08K 3/36 (2013.01); C08L 83/04 (2013.01); C09C 1/3081 (2013.01); C09C 3/12 (2013.01);
(Continued)

(58) Field of Classification Search
None
See application file for complete search history.

(56) References Cited

U.S. PATENT DOCUMENTS 3,450,738 A * 6/1969 Blochl ................ D06M 15/657
252/8.57
8,058,463 B2 * 11/2011 Herzog ................ C07F 7/1804
556/413
(Continued)

FOREIGN PATENT DOCUMENTS

CN 107649346 A * 2/2018
KR 10-1666193 B1 10/2016

OTHER PUBLICATIONS

English machine translation of Zhang et al. (CN 107649346 A) accessed online from Espacenet; attached as PDF pp. 1-12. (Year: 2018).*

(Continued)

*Primary Examiner* — Katie L. Hammer
(74) *Attorney, Agent, or Firm* — The PL Law Group, PLLC

(57) ABSTRACT

A method of forming nanoparticles having superhydrophobicity includes preparing a PDMS film including a structure having a predetermined shape on a surface thereof, and generating the nanoparticles having superhydrophobicity on the surface of the PDMS film by combusting the surface of the PDMS film using a diffusion flame. Transparent nanoparticles having superhydrophobicity and oleophobicity may be generated simply and easily on the surface of the PDMS film.

7 Claims, 19 Drawing Sheets

(51) Int. Cl.

| | |
|---|---|
| C08J 7/06 | (2006.01) |
| C08K 3/04 | (2006.01) |
| C08K 3/36 | (2006.01) |
| C08L 83/04 | (2006.01) |
| C09C 1/30 | (2006.01) |
| C09C 3/12 | (2006.01) |
| B82Y 40/00 | (2011.01) |
| B82Y 30/00 | (2011.01) |

(52) U.S. Cl.
CPC .............. *B82Y 30/00* (2013.01); *B82Y 40/00* (2013.01); *C08J 2383/04* (2013.01)

(56) References Cited

U.S. PATENT DOCUMENTS

2007/0264172 A1\* 11/2007 Mosimann .............. F23D 14/22
422/150

2010/0004373 A1\* 1/2010 Zhu ...................... C09D 133/20
524/847
2017/0100912 A1\* 4/2017 Tricoli ..................... B32B 5/02

OTHER PUBLICATIONS

Office action dated Jun. 25, 2020 from Korean Patent Office in a counterpart Korean Patent Application No. 10-2019-0051299 (all the cited references are listed in this IDS.) (English translation is also submitted herewith.).

C.Hak-Jong et al., "Fabrication of Superhydrophobic and Oleophobic Surfaces with Overhang Structure by Reverse Nanoimprint Lithography", Journal of Physical Chemistry C.(Oct. 21, 2013.).

ChaeRin Yu et al., "Fabrication of hydrophobic PDMS film using two-step lithography and improvement of hydrophobicity by heat treatment-based nanosilica formation", The 20th Korean MEMS conference(Apr. 5-7, 2018.) English translation of Abstract in the first page is submitted herewith.

\* cited by examiner (a) Process diagram of mushroom structure (b) Process diagram of cylindrical structure (a) Mushroom structure (b) Process diagram of cylindrical structure

147°

Circle : Superhydrophobic PDMS with nanoparticle after heating
Triangle : Superhydrophobic PDMS with nanoparticle
Square : general PDMS (no structure)

METHOD OF FORMING NANOPARTICLES HAVING SUPERHYDROPHOBICITY

CROSS-REFERENCE TO RELATED APPLICATIONS

This application claims priority to Korean Patent Application No. 10-2019-0051299, filed on May 2, 2019, and all the benefits accruing therefrom under 35 U.S.C. § 119, the content of which in its entirety is herein incorporated by reference.

BACKGROUND OF THE INVENTION

1. Field of the Invention

The present invention relates to a method of forming nanoparticles having superhydrophobicity. More particularly, the present invention relates to a method of forming nanoparticles having superhydrophobicity, in which the surface of a transparent PDMS(Polydimethylsiloxane) film including a microstructure having a predetermined shape on the surface thereof is combusted using a diffusion flame, thus simply and easily generating transparent nanoparticles having superhydrophobicity and oleophobicity on the surface of the PDMS film.

2. Description of the Related Art

A superhydrophobic or super-water-repellent surface has a contact angle of 150° or more at an interface thereof with respect to water droplets and a roll-off angle of 10° or less, and is self-cleaning without being wetted.

Representative examples thereof include lotus leaves, butterfly wings, and the legs of a water strider. Since water droplets may easily roll off of a super-water-repellent surface, the super-water-repellent surface has characteristics of contamination prevention, self-cleaning ability, and droplet control. Accordingly, super-water-repellent surfaces are used in various biological and industrial applications such as ice prevention, fog prevention, cell control, water droplet collection, and the removal of surface contaminants.

In order to mimic this super-water-repellent surface, materials having low surface energy are mainly used, so that the surface cohesion force of the liquid is greater than the surface tension of the solid or a micro/nano layer structure is formed to thus minimize contact with water droplets.

Meanwhile, the state of water droplets on the surface mainly depends on factors such as low surface energy and surface roughness, and studies in which hydrophobic surfaces are artificially made have been reported.

Examples of research to mimic super-water-repellent surfaces include studies on manufacturing micro-nano structures after etching silicon using photolithography, studies on processing silicon surfaces using a laser to form super-water-repellent surfaces, and other studies using metals and nanotubes. These studies have a drawback in that the field of application thereof is narrow because of the extremely low transmittance and the low elasticity of the substrate that is used.

Meanwhile, research on depositing silica on surfaces while elasticity is ensured and research on forming super-water-repellent surfaces by spraying nano-composites have recently been conducted. However, there are drawbacks in that transparency cannot be realized and repellency is realized for water only.

In particular, as shown in FIG. 1, in the case of the microstructures of several hydrophobic surfaces, water droplets are trapped between the structures according to the volume thereof as transition from a Cassie-Baxter state to a Wenzel state occurs with the passage of time due to the action of gravity between the ground and the water droplets, thus causing a wetting phenomenon.

Further, in the case of the microstructure, the hydrophobicity thereof is lost when the microstructure is damaged, so it is necessary to increase durability by generating a nanostructure on the microstructure.

In this regard, research has been performed with the goal of coating hydrophobic surfaces with nanoparticles so that the roughness thereof is increased, thus maximizing a contact angle. However, there are drawbacks in that the physically sprayed nanoparticles are easily removed even by a small impact and the structure becomes uneven due to the aggregation of the sprayed nanoparticles.

SUMMARY

Accordingly, the present invention has been made keeping in mind the above problems occurring in the related art, and an object of the present invention is to provide a method of forming transparent nanoparticles having superhydrophobicity on the surface of a microstructure, in which the surface of a transparent PDMS film including a microstructure having a predetermined shape on the surface thereof is combusted using a diffusion flame, thus simply and easily generating transparent nanoparticles having superhydrophobicity and oleophobicity on the surface of the PDMS film.

Meanwhile, the objects of the present invention are not limited to the above-mentioned object, and other objects that are not mentioned will be clearly understood by those skilled in the art from the following description.

In order to accomplish one or more of the above object, a method of forming nanoparticles having superhydrophobicity according to an embodiment of the present invention may include preparing a PDMS film including a structure having a predetermined shape on the surface thereof and generating the nanoparticles having superhydrophobicity on the surface of the PDMS film by combusting the surface of the PDMS film using a diffusion flame.

For example, the diffusion flame may be a flame of 500° C. or higher generated during diffusion combustion of a paraffin candle or a soy candle.

For example, the generating the nanoparticles may include combusting the surface of the PDMS film using the diffusion flame for 40 to 50 seconds.

For example, the nanoparticles may include silica particles and carbon particles.

For example, the generating the nanoparticles may include combusting the PDMS film while the PDMS film is tilted at a predetermined slope in order to generate the uniform nanoparticles on the sidewall of the structure.

For example, the structure may be a structure which has any one shape selected from among shapes including a mushroom, a square pillar, and a cylinder, and a micro-unit size.

For example, the method may further include applying fluorine-group silane on the surface of the PDMS film, on which the nanoparticles are generated, in order to ensure oleophobicity.

For example, in the applying the fluorine-group silane, n-hexane and heptadecafluoro-1,1,2,2-tetrahydrodecyl-trichlorosilane may be mixed at a ratio of 1000:1, PDMS on which nano-silica is generated may be immersed in a solution for 24 hours, and the PDMS film may be cleaned in hexane after 24 hours and then dried in an oven at 60° C. for 3 hours.

In a method of forming nanoparticles having superhydrophobicity according to an embodiment of the present invention, the surface of a transparent PDMS film including a microstructure having a predetermined shape on the surface thereof is combusted using a diffusion flame, thus simply and easily generating transparent nanoparticles having superhydrophobicity and oleophobicity on the surface of the PDMS film.

BRIEF DESCRIPTION OF THE DRAWINGS

The above and other objects, features and advantages of the present invention will be more clearly understood from the following detailed description taken in conjunction with the accompanying drawings, in which.

Figure 3:
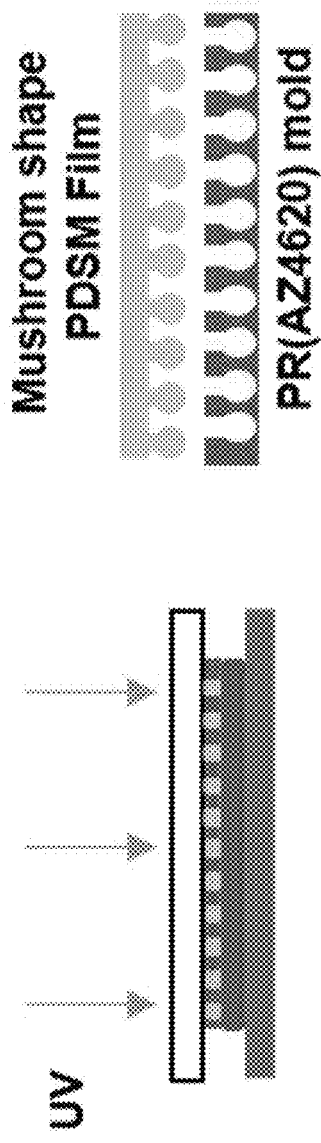
FIG. 3 is a process diagram showing steps of forming a microstructure on the surface of a transparent PDMS film.
Figure 3:
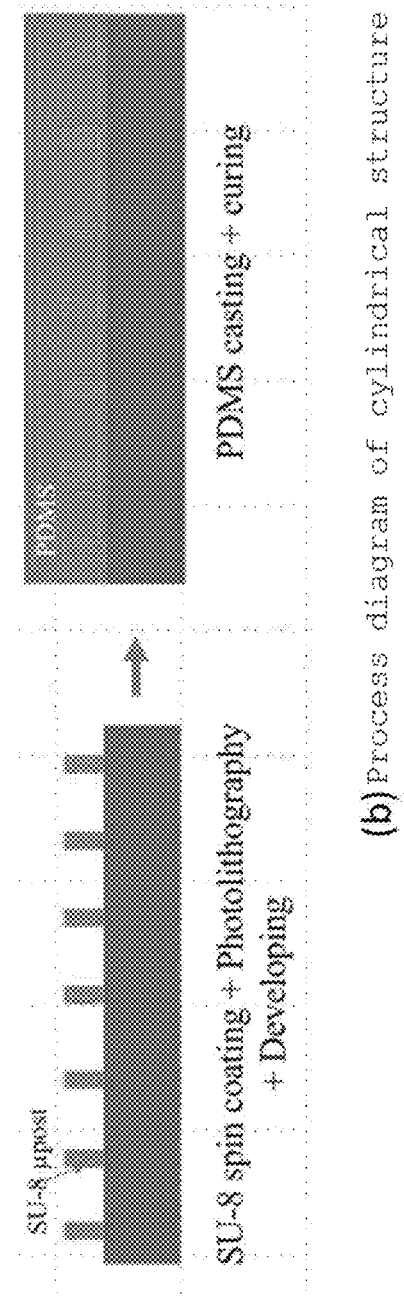
Figure 4:
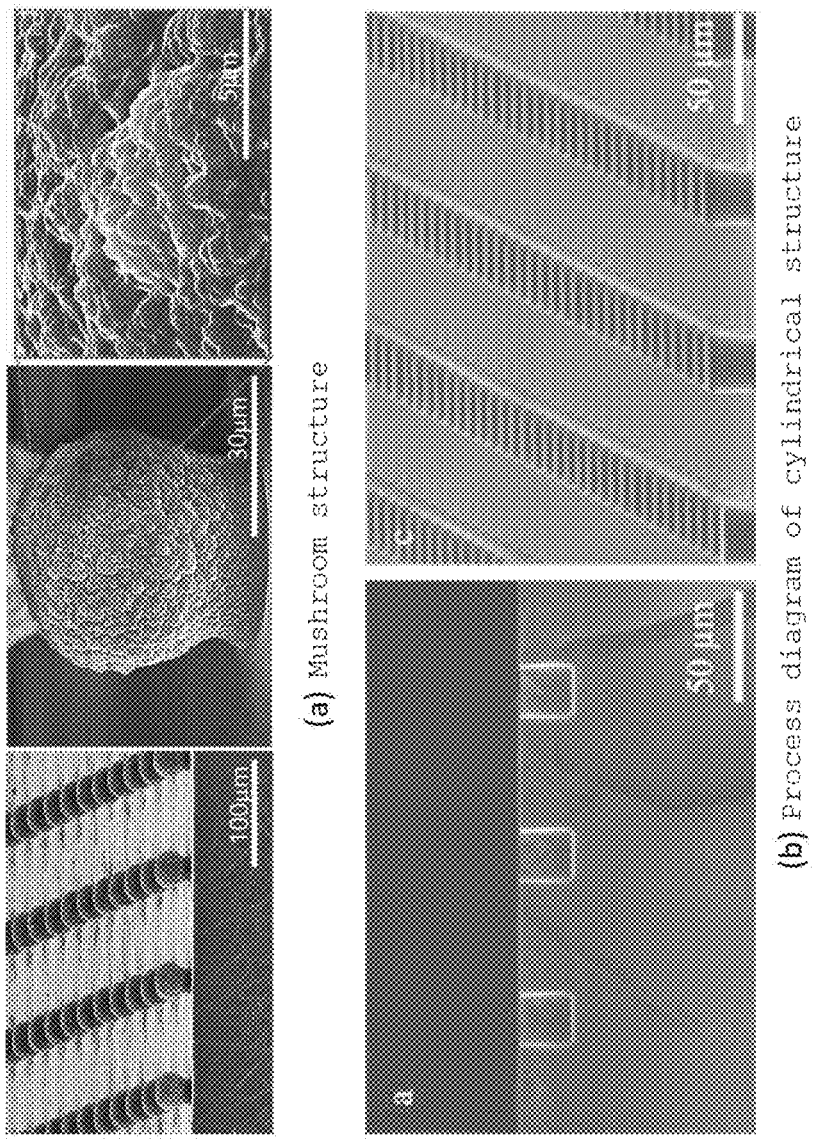
Figure 5:
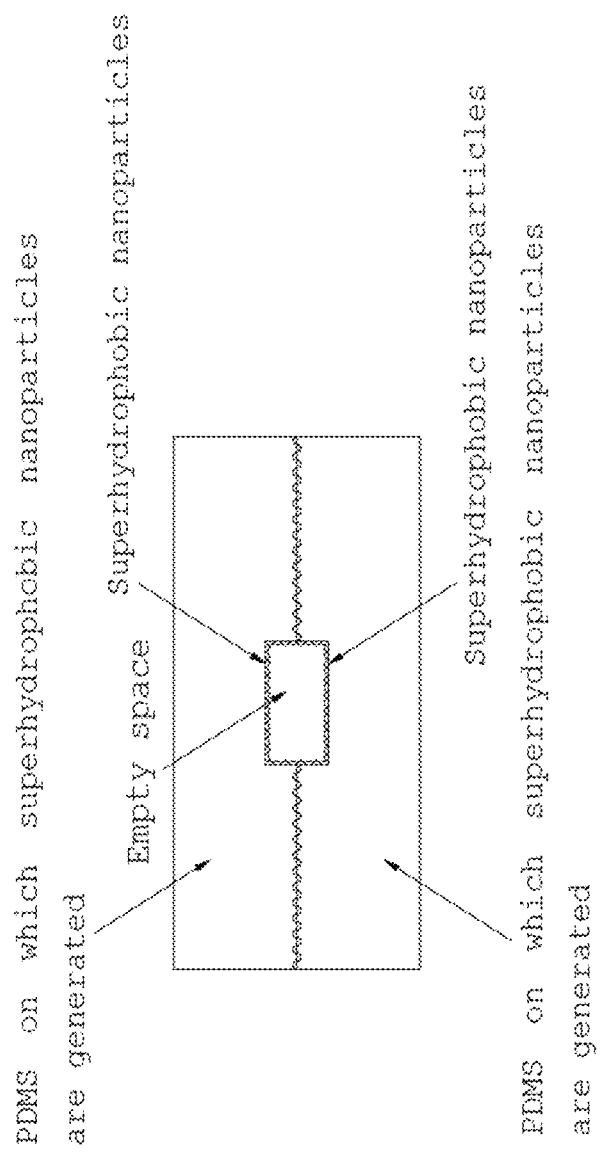
Figure 6:
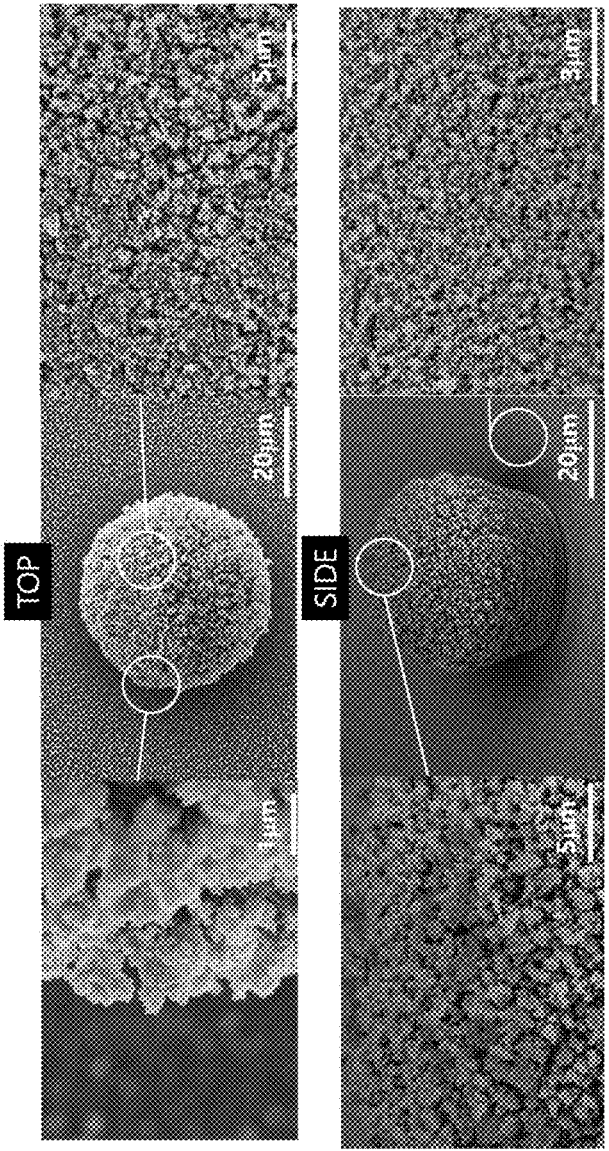
Figure 7:
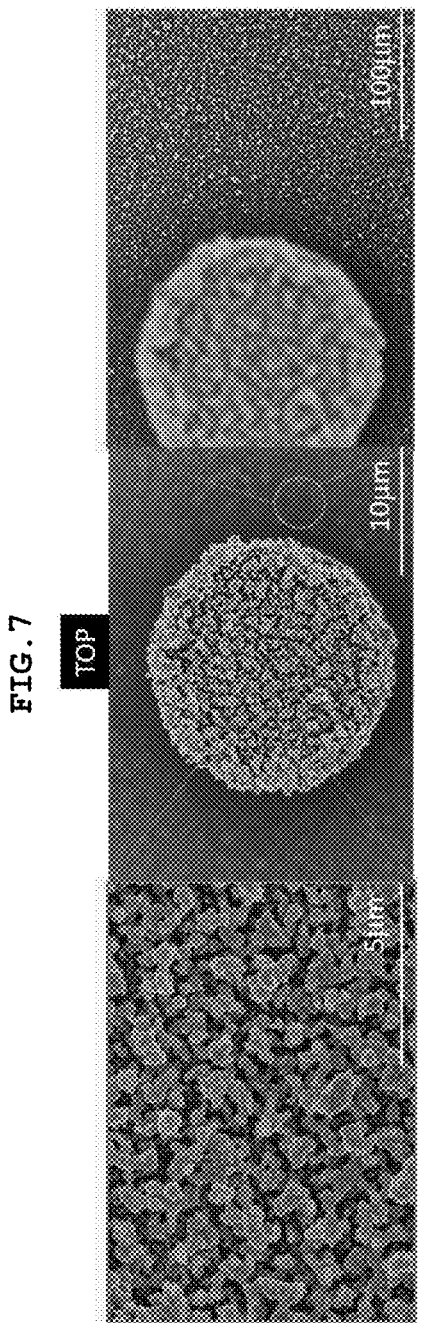
Figure 8:
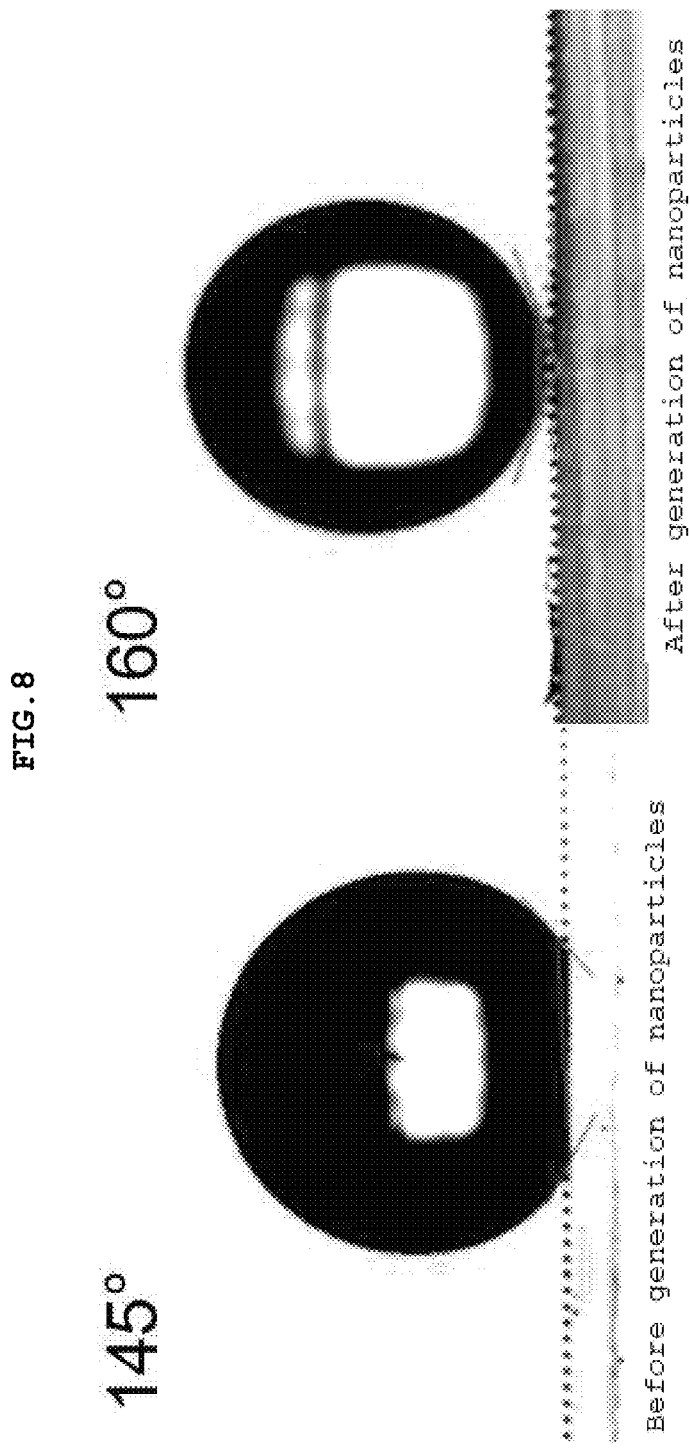
Figure 9:
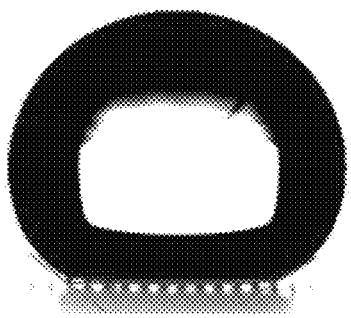
Figure 10:
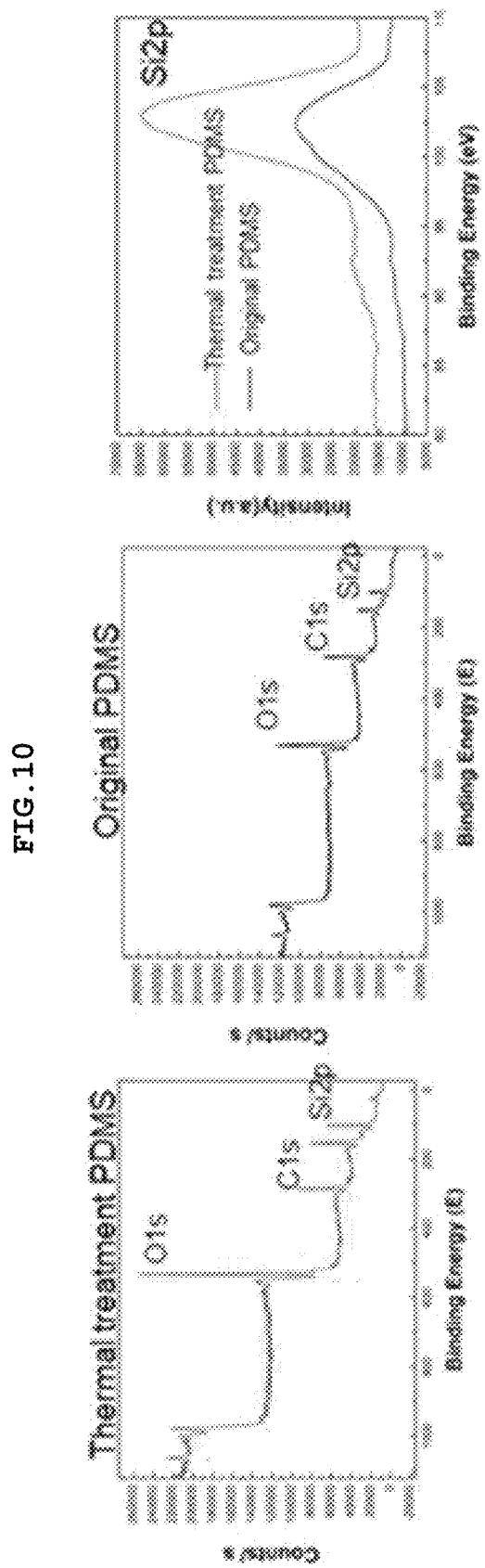
Figure 11:
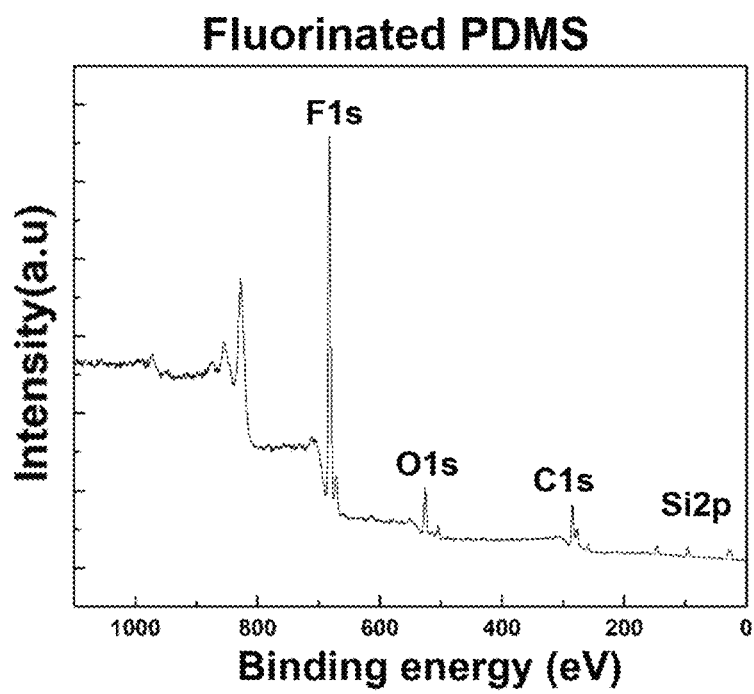
Figure 12:
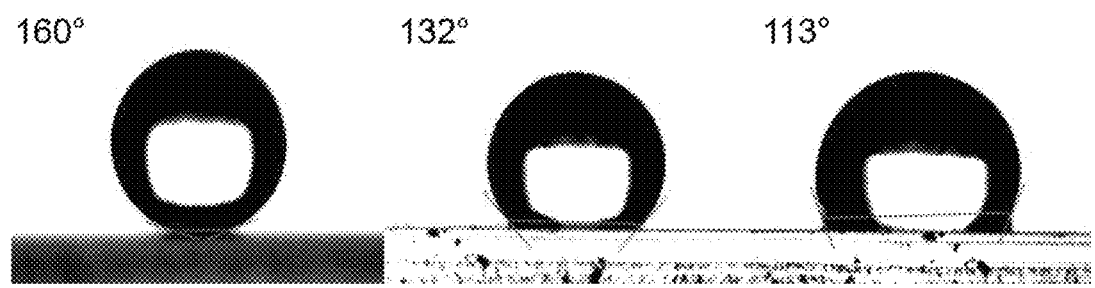
Figure 13:
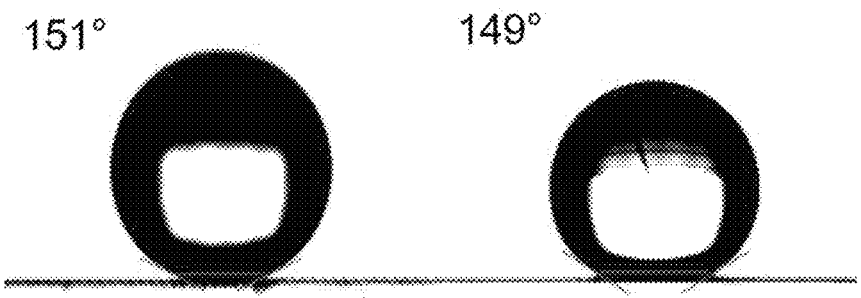
Figure 14:
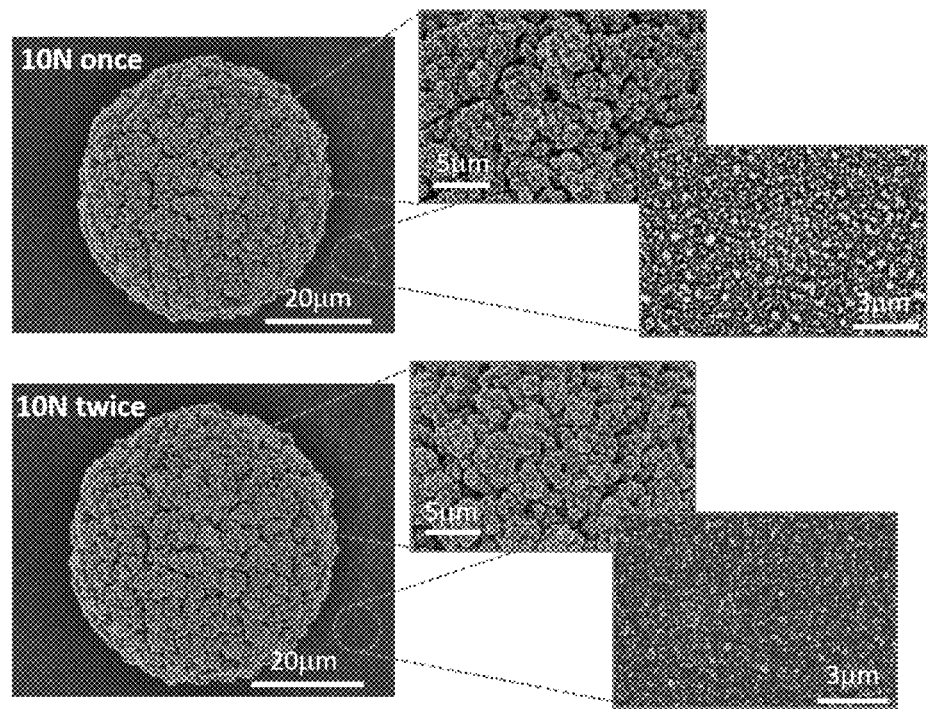
Figure 15:
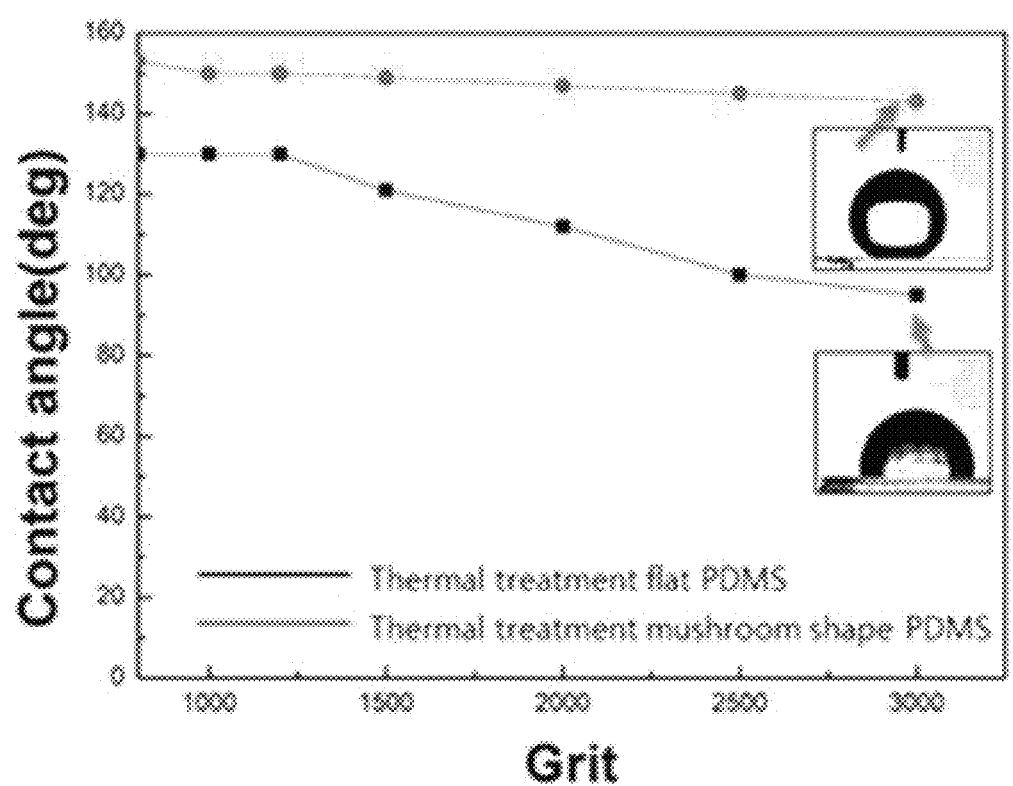
Figure 16:
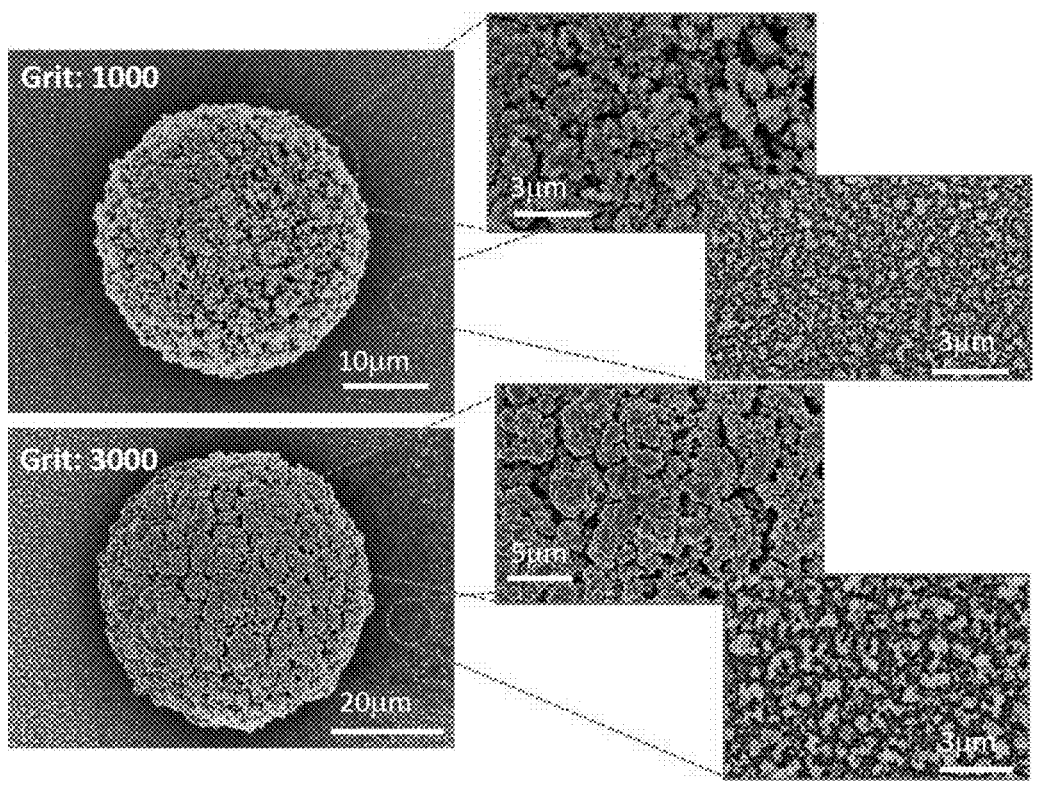
Figure 17:
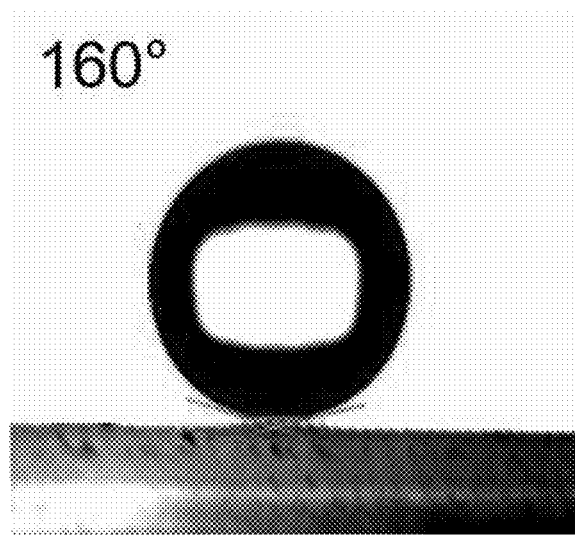
Figure 18:
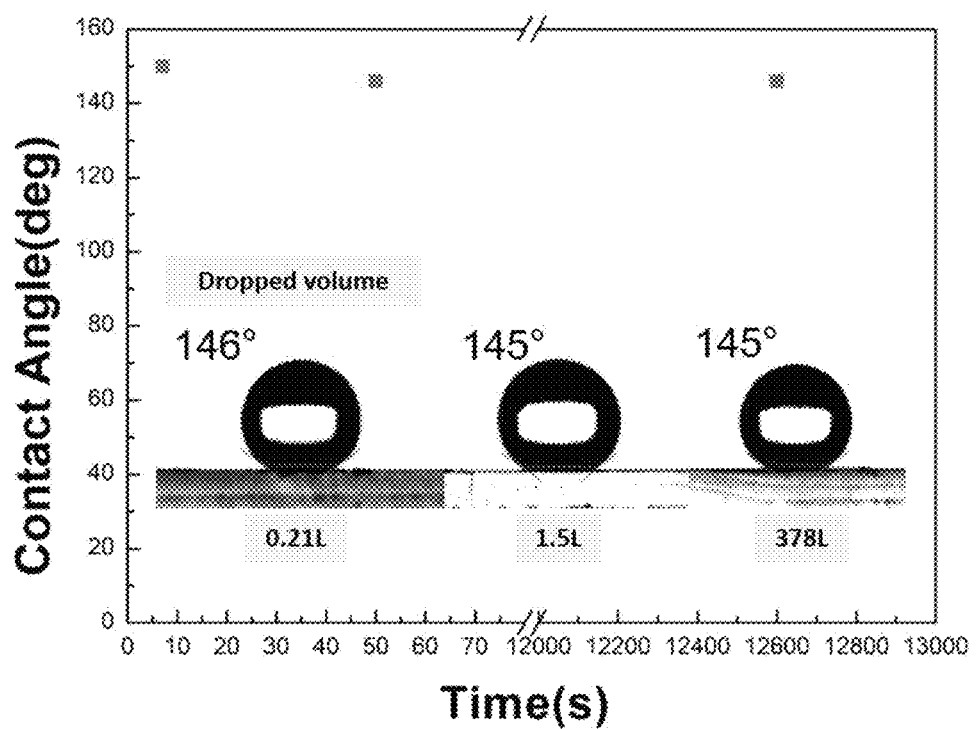
Figure 19:
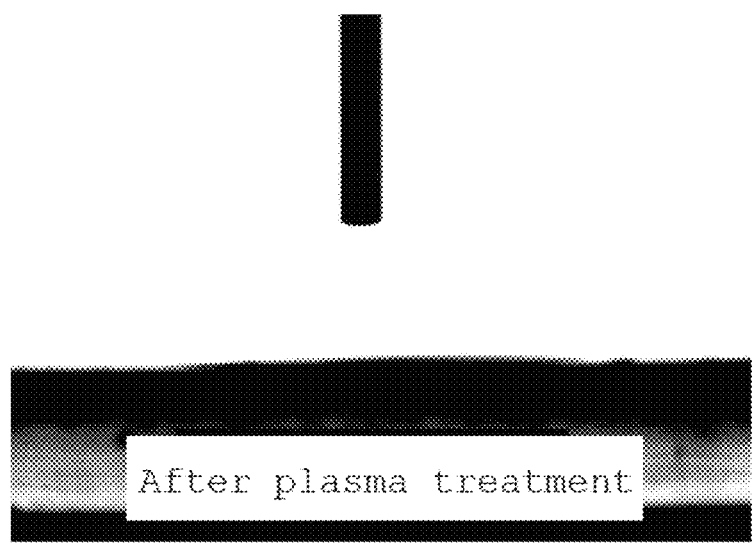
Figure 20:
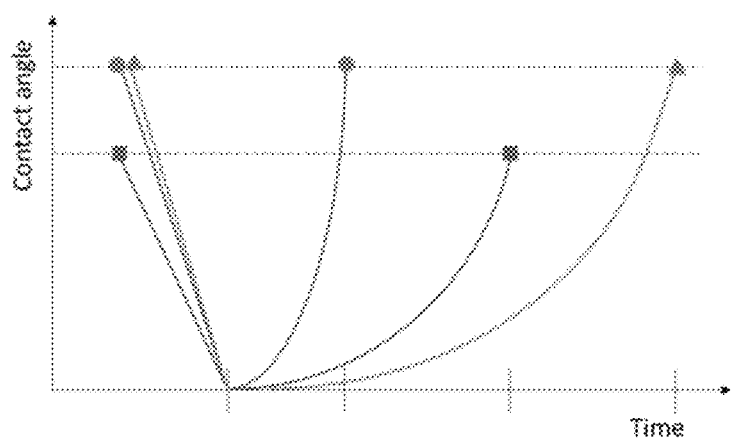
Figure 21:
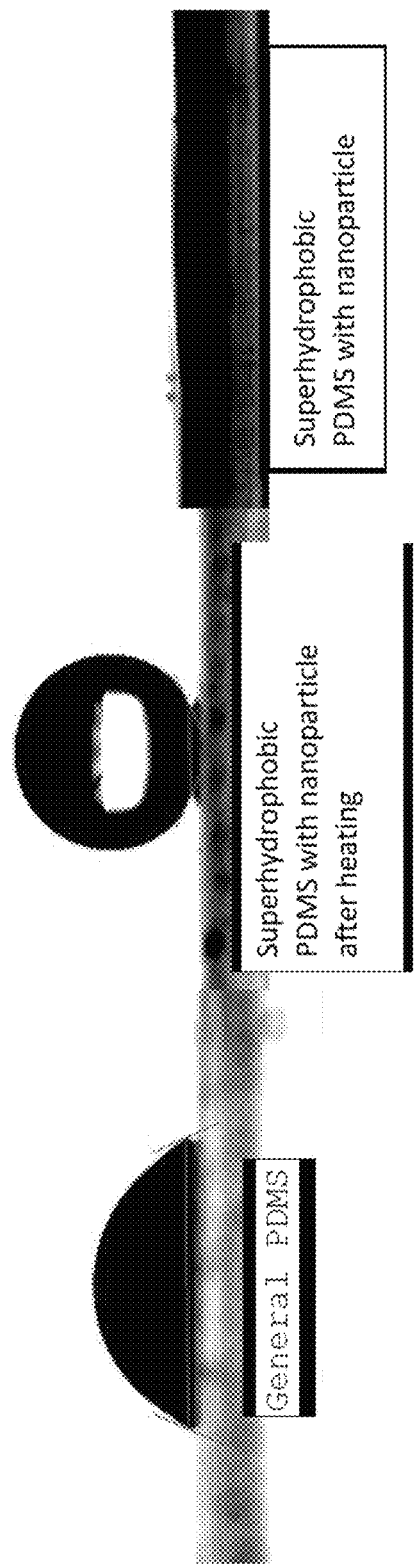
Figure 22:
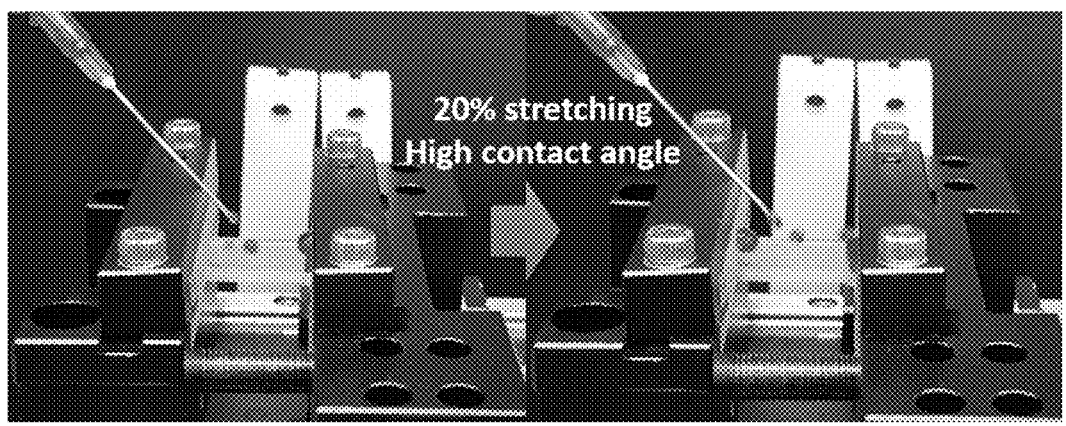
Figure 23:
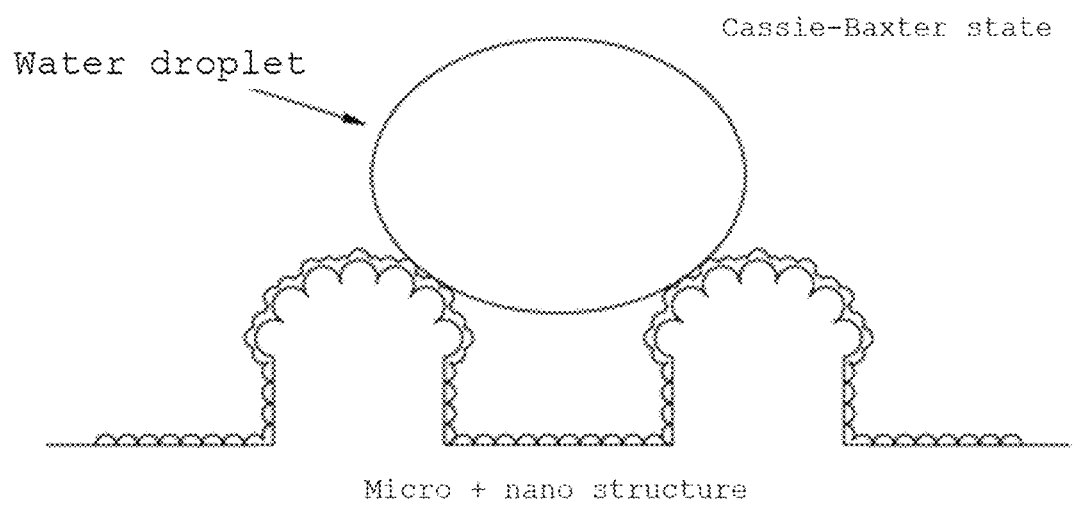

(a) and (b) of FIG. 4 are SEM (scanning electron microscope) images showing the shape of the microstructure folioed through the steps shown in FIG. 3;

FIG. 5 is a view showing the microchannel of a super-water-repellent surface using PDMS on which superhydrophobic nanoparticles are generated;

FIG. 6 is images showing a PDMS film (mushroom structure) on which super-water-repellent nano-silica particles are generated according to the embodiment of the present invention;

FIG. 7 is SEM images showing a PDMS film (cylindrical structure) on which super-water-repellent nano-silica particles are generated according to another embodiment of the present invention;

FIG. 8 is images showing a contact angle (145°) before surface combustion and a contact angle (161°) after surface combustion;

FIG. 9 is an image showing a contact angle (147°) for n-hexadecane after HDFS coating;

FIG. 10 is graphs showing the results of XPS analysis of element contents of the surface of a PDMS film, on which hydrophobic nanoparticles are generated, when the PDMS film having a mushroom structure manufactured through a PR mold is combusted using a diffusion flame;

FIG. 11 is a graph showing the results of XPS analysis of the surface after HDFS coating;

FIG. 12 is images showing a change in contact angle (161°, 132°, and 113°) in a flat PDMS when a Scotch tape is attached thereto and then removed;

FIG. 13 is images showing a change in contact angle in a PDMS having a mushroom structure when a Scotch tape is attached thereto and then removed;

FIG. 14 is SEM images of a surface of which a contact angle is measured in FIG. 13;

FIG. 15 is a graph showing a change in contact angle depending on the grit of sandpaper when an average force of 1 N is applied;

FIG. 16 is SEM images of a mushroom-structure surface which is subjected to sliding with 1000 grit and a mushroom-structure surface which is subjected to sliding with 3000 grit;

FIG. 17 is an image showing the contact angle of a super-water-repellent PDMS film after a sand impact is applied according to a durability test for the sand impact at a predetermined velocity;

FIG. 18 is an image showing a change in contact angle depending on the volume of drops after dropping water;

FIGS. 19 to 21 are images and a graph showing the results of a plasma experiment;

FIG. 22 is an image showing the results of a tensile test on PDMS films manufactured according to embodiments of the present invention; and FIG. 23 is a view showing the result of a Cassie-Baxter state in which wetting does not occur when a nanostructure is situated on a microstructure.

DETAILED DESCRIPTION

The terminology used in the present invention is a general term that is widely used at present. However, in some cases, the term is arbitrarily selected by the applicant. In such cases, the meaning should be grasped in consideration of the meaning described or used in the detailed description of the invention, rather than according to the name of the tem.

Hereinafter, the technical constitution of the present invention will be described in detail with reference to the preferred embodiments shown in the accompanying drawings.

However, the present invention is not limited to the embodiments described herein and may be embodied in other forms. Like reference numerals refer to like elements throughout the specification.

Figure 1:
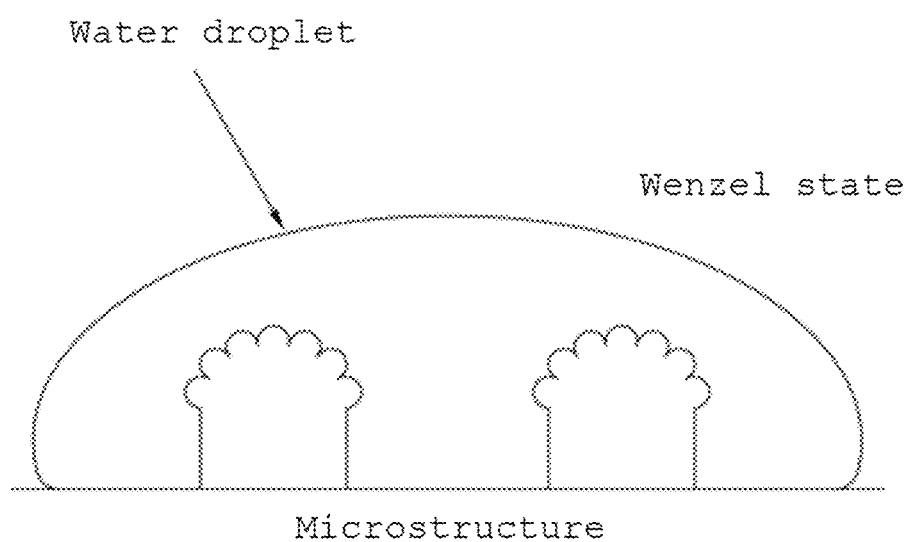
FIG. 1 is a view showing a hydrophobic surface having a conventional microstructure in a Wenzel state.
Figure 2:
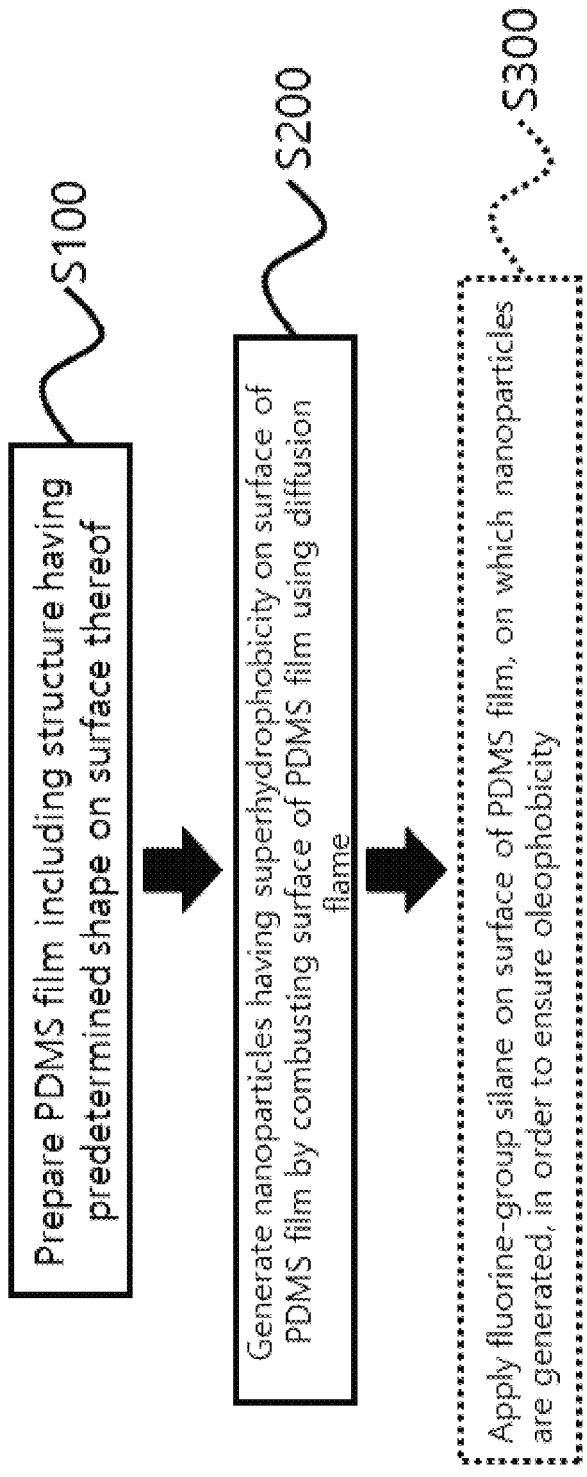
FIG. 2 is an overall process diagram of a method of forming nanoparticles having super water repellency according to an embodiment of the present invention.

In this regard, first, FIG. 2 is an overall process diagram of a method of forming nanoparticles having super water repellency according to an embodiment of the present invention, FIG. 3 is a process diagram showing steps of forming a microstructure on the surface of a transparent PDMS film, (a) and (b) of FIG. 4 are SEM (scanning electron microscope) images showing the shape of the microstructure formed through the steps shown in FIG. 3, FIG. 5 is a view showing the microchannel of a super-water-repellent surface using PDMS on which superhydrophobic nanoparticles are generated, FIG. 6 is images showing a PDMS film (mushroom structure) on which super-water-repellent nano-silica particles are generated according to the embodiment of the present invention, and FIG. 7 is SEM images showing a PDMS film (cylindrical structure) on which super-water-repellent nano-silica particles are generated according to another embodiment of the present invention.

Referring to FIGS. 2 to 7, the method of forming the nanoparticles having superhydrophobicity according to the embodiments of the present invention includes preparing a PDMS film including a structure having a predetermined shape on the surface thereof at step S100.

The PDMS film means polydimethylsiloane. Referring to FIG. 3, the step of preparing the PDMS film including the structure having a predetermined shape on the surface thereof according to the embodiments of the present invention includes manufacturing a photoresist mold using a photolithography method to cure the PDMS, thus manufacturing a micro-unit structure.

The PR that is used is AZ4620, and a base and a curing agent are used at a ratio of 10:1 to obtain the PDMS.

Meanwhile, in the method of manufacturing the mold, the PR is subjected to underbaking during a soft baking process, unlike a general photolithography process, so that a solvent is not completely removed. Accordingly, the solvent absorbs light during the underexposure to thus manufacture a PR mold having a mushroom-shaped vertical microstructure.

After the PDMS is cured in the mold that is manufactured, the mold is removed to obtain the structure shown in the SEM images of (a) and (b) of FIG. 4.

(a) of FIG. 4 shows a mushroom-shaped microstructure formed on the surface of the PDMS according to an embodiment of the present invention, and (b) of FIG. 4 shows a cylindrical microstructure on the surface of the PDMS according to another embodiment of the present invention.

Meanwhile, in the embodiments of the present invention, the shape of the microstructure is described as an example of a mushroom or a cylinder but is not necessarily limited thereto, and the microstructure may be formed so as to have various shapes such as that of a square pillar.

Meanwhile, after the PDMS film is manufactured using the photolithography process as shown in FIG. 3 and additional superhydrophobic nanoparticles are generated, microchannels may be formed in the super-water-repellent surface through micro-contact printing.

In more detail, microchannels of empty spaces as shown in FIG. 5 may be formed by attaching the manufactured PDMS film having empty spaces to another PDMS film having empty spaces using micro-contact printing.

Meanwhile, the method of forming the nanoparticles having superhydrophobicity according to the embodiments of the present invention includes generating the nanoparticles having superhydrophobicity on the surface of the PDMS film by combusting the surface of the PDMS film using a diffusion flame at step S200.

"Diffusion flame" refers to a flame generated during diffusion combustion. In diffusion combustion, only fuel is ejected, without mixing fuel and air, and all of the air needed for combustion is supplied through slow mixing of air and fuel due to diffusion around the flame, thereby performing combustion.

Meanwhile, in the embodiments of the present invention, in the case of a diffusion flame, a flame of 500° C. or higher, generated during diffusion combustion of a paraffin candle or a soy candle, is used. A soy candle is a compound word of soybeans and candles and means a candle made from a material extracted from soybeans, unlike a paraffin candle made from petroleum.

In the case of a candle including wax from a natural source, such as the soy candle, soot may be reduced, thus improving transmittance.

Meanwhile, the step of generating the nanoparticles according to the embodiments of the present invention at step S200 includes combusting the surface of the PDMS film using the diffusion flame for 40 to 50 seconds, and more particularly 45 seconds.

The surface of the PDMS film is exposed to the diffusion flame under the above-described temperature and time conditions, so that nanoparticles are generated on the surface thereof when the hydrophobic PDMS film is heated to a temperature above a flash point, and the surface of the modified nanoparticles has superhydrophobicity.

The nanoparticles include silica particles and carbon particles.

Meanwhile, in the method of forming the nanoparticles having superhydrophobicity according to the embodiments of the present invention, when heating is performed using the paraffin candle or the soy candle, the nanoparticles are uniformly formed on the front surface of the PDMS film while the PDMS film is tilted at a predetermined slope in order to form the uniform nanoparticles on the sidewall of the microstructure.

The slope may have various values as needed, and no special limitation is applied thereto.

As a result, in the method of forming the nanoparticles having superhydrophobicity according to the embodiments of the present invention, transparent nanoparticles having superhydrophobicity may be formed on the surface of the microstructure through the above-described technical constitutions, as shown in FIGS. 6 and 7.

Meanwhile, the method of forming the nanoparticles having superhydrophobicity according to the embodiments of the present invention further includes applying fluorine-group silane on the surface of the PDMS film, on which the nanoparticles are generated, in order to ensure oleophobicity at step S300.

In the step of applying the fluorine-group silane at step S300, n-hexane and heptadecafluoro-1,1,2,2-tetrahydro-decyltrichlorosilane (HDFS) are mixed at a ratio of 1000:1, the PDMS on which nano-silica is generated is immersed in a solution for 24 hours, and the PDMS film is cleaned in hexane after 24 hours and then dried in an oven at 60° C. for 3 hours.

In the embodiments of the present invention, the nanoparticles are generated on the PDMS through combustion using the diffusion flame. Accordingly, when the fluorine-group silane is applied on the surface thereof through dip coating, Si and F may be attached to each other, thus reducing surface energy, whereby oleophobicity is ensured.

Hereinafter, the effect of the surface of the PDMS having the microstructure on which the nanoparticles having superhydrophobicity are folioed according to the embodiments of the present invention will be described in detail.

1. Contact Angle

In this regard, first, FIG. 8 is images showing a contact angle (145°) before surface combustion and a contact angle) (161°) after surface combustion, and FIG. 9 is an image showing a contact angle (147°) for n-hexadecane after HDFS coating.

When the mushroom structure is generated, the contact angle of the PDMS film is 145°, which is higher than that of a flat PDMS. However, there are drawbacks in that a roll-off angle is low and in that wetting occurs when water dynamically drops. When the nanoparticles are generated through thermal treatment, a Cassie-Baxter state is maintained without wetting and a high water-repellent angle of 161° is ensured due to the merit of air pockets formed between the structures.

Further, when the HDFS coating is further performed, the surface energy is reduced, and an oil-repelling angle is high. As shown in FIG. 9, the oil-repelling angle is observed to be 147°, thereby ensuring oleophobicity.

2. XPS Result

In this regard, FIG. 10 is a graph showing the results of XPS analysis of element contents of the surface of a PDMS film, on which hydrophobic nanoparticles are generated, when the PDMS film having a mushroom structure manufactured through a PR mold is combusted using a diffusion flame, and FIG. 11 is a graph showing the results of XPS analysis of the surface after HDFS coating.

Referring to FIGS. 10 and 11, the four peaks observed through the measurement each represent a spectrum of oxygen atom Ols, a spectrum of carbon atom Cls, and spectra of silicon atoms Si2P and Si2S.

After the thermal treatment, the peak of Si is exhibited at a binding energy of 103 eV, confirming that a significant number of the generated nanoparticles are nano-silica.

Meanwhile, the nano-silica generated on the mushroom structure acts as an air pocket, causing water droplets to bounce instead of wetting when they come into contact with the surface and ensuring a contact angle of 160° or more. After coating the surface with HDFS, through XPS it is confirmed that Si and F are combined, thus increasing the peak of F.

3. Experiment on Persistence of Super Water Repellency 3M tape

In many studies, the surface is subjected to hydrophobic coating to increase the contact angle.

However, when performing coating, uniform spraying must be applied to materials and surfaces, and the spraying causes environmental pollution. In order to overcome the drawback in which a coating material is removed over time due to the weakness of the bond between the surface and the coating material, a method of generating nano-silica or enabling a predetermined structure to grow on the surface through a chemical reaction may be used.

However, when nano-silica is formed on the surface of the flat PDMS, nano-silica is removed even by small damage, so that the superhydrophobicity is easily lost.

After the microstructure for overcoming the above-described drawbacks is formed to manufacture the hydrophobic structure, a durability experiment is performed. When the surface is damaged, the nanoparticles are removed only at the top of the mushroom structure, not at the bottom thereof, due to the chemical bonding of the nanoparticles, whereby the contact angle is maintained.

In this regard, FIG. 12 is images showing a change in contact angle (161°, 132°, and 113°) in a flat PDMS when a Scotch tape is attached thereto and then removed, FIG. 13 is images showing a change in contact angle (161°, 150°, and 146°) in a PDMS having a mushroom structure when a Scotch tape is attached thereto and then removed, and FIG. 14 is SEM images of a surface of which a contact angle is measured in FIG. 13.

Referring to FIGS. 12 to 14, a Scotch tape is attached to the surface of the super-water-repellent film that is manufactured in advance and then removed by applying a predetermined force, and this shows the excellence of silica formation on the mushroom structure and the durability of the flat PDMS nano-silica.

In the case of the flat PDMS film, the contact angle is reduced from 161° to 132° when the Scotch tape is attached and then removed with a force of 44.59 mN. When a force of 89.18 mN is applied, the contact angle is reduced to 113°, which is the same level as in the flat PDMS film before combustion.

However, in the case of the PDMS film of nano-silica on the mushroom structure according to the embodiments of the present invention, the contact angle is 161° when the nano-silica is formed, the contact angle is 150° when the Scotch tape is attached and then removed with a force of 10 N, and a similar contact angle, specifically 146°, is exhibited when a force of 10 N is applied twice.

This shows that a high contact angle is maintained even after repeated damage.

Sandpaper experiment

In this regard, first, FIG. 15 is a graph showing a change in contact angle depending on the grit of sandpaper when an average force of 1 N is applied, and FIG. 16 is SEM images of a mushroom-structure surface which is subjected to sliding with 1000 grit and a mushroom-structure surface which is subjected to sliding with 3000 grit.

Referring to FIGS. 15 and 16, in order to measure the increased durability when the nanoparticles are formed on the microstructure, sandpaper having grit of 1000, 1200, 1500, 2000, 2500, and 3000 was used.

This experiment is a method of causing damage using sliding, unlike the above-described contact-type damage using the tape. The contact angle when the sandpaper having respective grits is rubbed once on the surface of the super-water-repellent PDMS film with an average force of 1 N is measured.

In the case of the flat PDMS film on which the nanoparticles are generated, the contact angle is 130° at 800 grit and 120° at 1000 grit. When damage is caused using sandpaper including the particles of 1500 grit or more, the contact angle of the flat PDMS film before combustion is reduced to 120° or less.

Further, when the nanoparticles are formed on the mushroom structure through combustion using a diffusion flame, the first contact angle is 150° or more. When damage is caused using the sandpaper including the particles of 1500 grit or more, the contact angle is reduced to 140°. The contact angle is almost unchanged up to 3000 grit.

Sand experiment

In this regard, FIG. 17 is an image showing the contact angle of a super-water-repellent PDMS film after a sand impact is applied according to a durability test for the sand impact at a predetermined velocity.

Referring to FIG. 17, in this experiment, 20 g of sand was poured from heights of 50 cm and 80 cm above the surface of the super-water-repellent PDMS film on which the nanoparticles are generated on the mushroom structure, and the film is tilted at a slope of 45°.

As a result of the experiment, when the contact angle of the film was measured after the sand impact was applied thereto, the contact angle was 160° or more, showing that the durability of the film was excellent.

Water experiment

In this regard, FIG. 18 is an image showing a change in contact angle depending on the volume of drops after dropping water.

This experiment is an experiment to confirm that the superhydrophobicity is maintained when the manufactured super-water-repellent film is exposed to external environmental factors such as rain. Tap water from a faucet was sprayed at a flow rate of 30 ml/s on the super-water-repellent PDMS film.

The film was oriented at an angle of 30° relative to the water stream, and the size thereof was 2 cm×2 cm. The speed of the water stream was faster than that of normal raindrops.

As a result of the experiment, 200 ml to 1,500 ml of water, corresponding to average precipitation in South Korea, was dropped, but the contact angle was still high, specifically, 150° or higher. The film was exposed to the water stream for 3 hours and 30 minutes so that the total amount of water applied was 378 k, but a high contact angle of 146° was maintained.

Plasma experiment

This experiment was performed using both a flat PDMS film and a PDMS film on which superhydrophobic nanoparticles were generated. Plasma treatment started at a pressure of $8.00e^{-2}$ torr, the power was 100 W, the oxygen flow rate was 20 sccm, and the plasma treatment time was 1 minute.

Referring to FIG. 19, experimental results showed that water droplet wetting occurred on the surfaces of both of the PDMS films in the case of the plasma treatment. In general, when the plasma treatment is performed, water droplet wetting temporarily occurs on the surface, but the contact angle returned back to an original value thereof after one day or more.

However, referring to FIGS. 20 and 21, in the case of the PDMS film of the superhydrophobic nanoparticles, water was trapped by the nanoparticles on the surface, and water droplet wetting occurred on the surface even after one day, and the surface was restored to a super-water-repellent surface within 24 hours through additional heating, which was experimentally confirmed.

In summary, when the surface on which the superhydrophobic nanoparticles were generated was subjected to plasma treatment, the contact angle was reduced, causing wetting. Since water was trapped by the nanoparticles on the surface, it took a relatively long time to restore the super-water-repellent surface. However, it was confirmed that the super-water-repellent surface was restored within 24 days through the heating.

4. Flexibility and Elasticity Test

The PDMS is capable of being used in bio- and wearable-based devices due to the flexibility thereof.

In this regard, referring to FIG. 22, which is an image showing the results of the tensile test of PDMS films manufactured according to embodiments of the present invention, the manufactured PDMS had the characteristic of super water repellency even when the PDMS was elongated with a predetermined force. In the experiment, the sample had a length of 28 mm and a thickness of 2 mm.

The tensile rate was 5%, 10%, 15%, 20%, and 25%, and when the water droplets were dropped in a tensioned state, it was confined that the water droplets easily rolled, even when air was weakly blown thereto.

As a result, in the case of the PDMS films manufactured according to the embodiments of the present invention, a unique mushroom-structure PDMS having a micro size is manufactured using a photolithography process, and nanoparticles are generated on the surface thereof through combustion using a diffusion flame so as to prevent the wetting of dynamic water droplets, thus manufacturing a super-water-repellent PDMS film having a micro/nano composite structure.

Meanwhile, the combustion method using the diffusion flame is simpler than a conventional spraying method, and in the combustion method, the micro/nano structure has a chemical bond, so that the nanoparticles are not damaged over time or due to external contamination. Various durability tests show that the combustion method is excellent.

Moreover, oleophobicity is ensured through HDFS coating, and a superhydrophobic/oleophobic PDMS film is manufactured, and exhibits an excellent contact angle of 147° with respect to hexadecane. The manufactured film is stretchable and transparent, so it may be used in solar cells or camera films.

Further, in the case of a water-repellent surface having a microstructure, when water droplets have a large volume or when time passes after the water droplets come into contact with the surface, the water droplets are changed from a Wenzel state to a Cassie-Baxter state, thus causing a drawback of wetting. However, when the nanostructure is situated on the microstructure, wetting does not occur, as shown in FIG. 23.

Although the preferred embodiments of the present invention have been disclosed for illustrative purposes, the present invention is not limited to the embodiments, and those skilled in the art will appreciate that various changes and modifications are possible, without departing from the spirit of the invention.

What is claimed is:

1. A method of forming nanoparticles having superhydrophobicity, the method comprising:
   preparing a polydimethylsiloxane (PDMS) film including a structure having a predetermined shape on a surface thereof;
   generating the nanoparticles having superhydrophobicity on the surface of the PDMS film by combusting the surface of the PDMS film using a diffusion flame; and
   applying fluorine-group silane on the surface of the PDMS film, on which the nanoparticles are generated, in order to ensure oleophobicity.

2. The method of claim 1, wherein the diffusion flame is a flame of 500° C. or higher generated during diffusion combustion of a paraffin candle or a soy candle.

3. The method of claim 1, wherein the generating the nanoparticles includes combusting the surface of the PDMS film using the diffusion flame for 40 to 50 seconds.

4. The method of claim 1, wherein the nanoparticles include silica particles and carbon particles.

5. The method of claim 1, wherein the generating of the nanoparticles includes combusting the PDMS film while the PDMS film is tilted at a predetermined slope in order to generate uniform nanoparticles on a sidewall of the structure.

6. The method of claim 1, wherein the structure has a shape selected from the group consisting of a mushroom, a square pillar, and a cylinder, and a micro-unit size.

7. The method of claim 1, wherein the applying of the fluorine-group silane comprises:
   immersing the PDMS film in a solution in which n-hexane and heptadecafluoro-1, 1, 2, 2-tetrahydrodecyltrichlorosilane are mixed at a ratio of 1000:1 for 24 hours;
   after the immersing, cleaning the PDMS film in hexane; and
   drying the cleaned PDMS film in an oven at 60° C. for 3 hours.

* * * * *